Feb. 4, 1969   A. L. FREEDLANDER ET AL   3,425,200
REINFORCED MOWER BLADE
Filed Feb. 19, 1968

INVENTORS
ABRAHAM L. FREEDLANDER
ROBERT E. MATTHEWS
WAYNE C. GARRETT
BY
Reuben Wolk
ATTORNEY United States Patent Office 3,425,200
Patented Feb. 4, 1969

3,425,200
REINFORCED MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Feb. 19, 1968, Ser. No. 706,360
U.S. Cl. 56—295
Int. Cl. A01d 55/18
3 Claims

ABSTRACT OF THE DISCLOSURE

A flexible mower blade primarily formed of an elastomeric material such as urethane and having a rigid metal or plastic central mounting plate bonded within the blade for mounting to the lawn mower shaft. Ears on the sides of the blade opposite the ends of the plate provide reinforcement.

---

Figure 1:
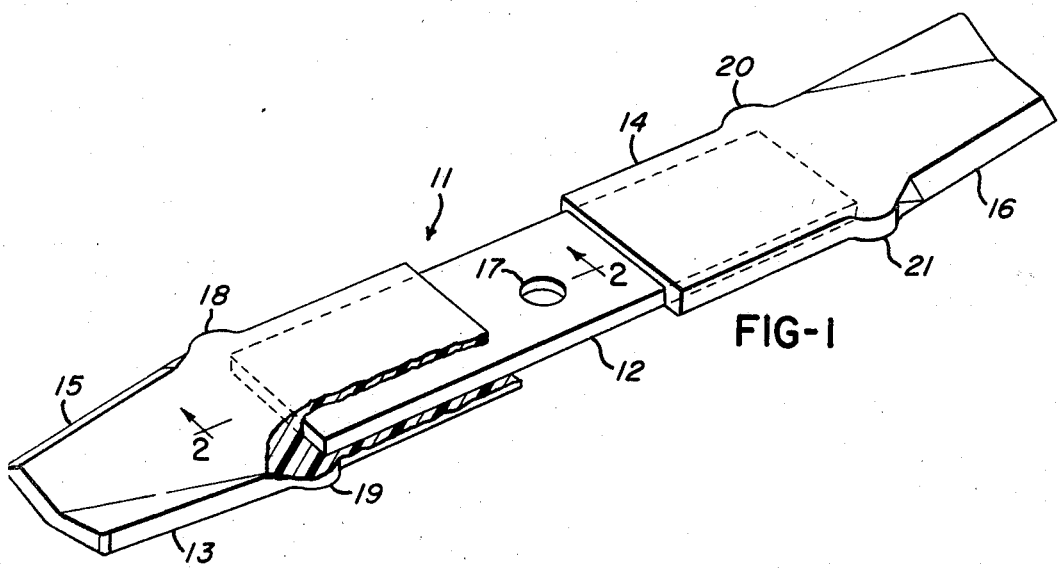

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our copending application Ser. No. 625,802, filed Mar. 24, 1967, we have described a blade made primarily of a urethane elastomer, but having a rigid central mounting plate embedded within the elastomer for mounting the blade upon the drive shaft. The present invention represents an improved form of blade in which the sides of the blade have ears opposite the ends of the plate for the purpose of reinforcing the blade at the point where the blade would tend to create the most stress. As indicated in the above-mentioned application, the central plate provides an improved mounting member which eliminates separate members that would otherwise be required. The plate also tends to reduce the elongation of the elastomeric material, controls the twisting torque of the cutting area, and also affects the up and down deflection of the tips. The ears provide additional reinforcing to the elastomeric material and minimize any tendency for the blade to crack opposite the ends of the plate, and also provide a little extra stiffness to the blade without seriously affecting the flexibility needed to provide safety in the cutting area.

Figure 2:
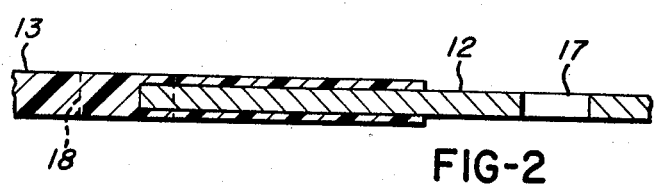

The specific embodiments of the invention are described in the following specification and claims, and illustrated in the drawings, in which:

FIGURE 1 is a perspective view of a novel blade.
FIGURE 2 is a cross-sectional view of the blade taken along line 2—2 of FIGURE 1.

Referring to the drawings, FIGURE 1 illustrates a lawn mower blade 11 which is generally flat and rectangular and has outwardly extending arms 13 and 14 having cutting edges 15 and 16 at their extremities. These arms are made of an elastomer, and preferably of a urethane elastomer such as more fully described in our copending application referred to above, of the type which may be molded or cast and formulated from a polyester or polyether based isocyanate terminated prepolymer. Mounted within the central portion of the blade is a rigid central mounting plate 12 which may be made of a metal or of a rigid plastic material such as nylon, polycarbonate, polystyrene, polyacetal, or the like. This plate is at least partially embedded within the arms and forms a central mounting member, the central section of the plate being exposed. An aperture 17 in the center of the plate permits mounting on the shaft of a lawn mower and the use of the appropriate hardware for mounting. The aperture 17 may be made with a diameter which is required to fit the smallest of the lawn mowers on the market, so that it is only necessary for the user to drill this hole out to a larger diameter if required for his particular mower. The plate which is illustrated provides a solid mounting member on the blade and at the same time stiffens the central portion of the blade. At the end of the plate a hinge line is created, about which there is a tendency for the end of the blade to flex in an up and down direction. This creates a stress that might cause the blade to fail at the hinge line. The stress is minimized by the use of the ears 18, 19, 20 and 21 located at the sides of the blade opposite the ends of the plate. Reinforcement is provided by these ears in a simple and effective manner. The ears are shown as being arcuate in shape, but may take other shapes such as square, triangular, etc.

Other modifications are further contemplated as being within the scope of the invention.

We claim:
1. In a lawn mower having a rotatable shaft and a cutting blade mounted thereon, said blade having outwardly extending arms having integral cutting edges of a flexible elastomer, a rigid central mounting plate extending outwardly into said arms and terminating inwardly of said cutting edges, and reinforcing ears integral with and located on the sides of said blade opposite the ends of said plate.

2. The blade of claim 1 in which said ears are in the shape of arcs extending outwardly from the side of said blade.

3. The blade of claim 1 in which said elastomer is urethane.

References Cited

UNITED STATES PATENTS

| | | | |
|---|---|---|---|
| 2,473,665 | 6/1949 | Van Nort | 170—159 |
| 3,320,732 | 5/1967 | Kirk | 56—295 |
| 3,340,682 | 9/1967 | Ely | 56—295 |
| 3,302,377 | 2/1967 | Ely | 56—295 |

ABRAHAM G. STONE, *Primary Examiner.*

P. A. RAZZANO, *Assistant Examiner.*